United States Patent [19]

Sterett

[11] Patent Number: 5,744,173
[45] Date of Patent: Apr. 28, 1998

[54] MOLD INSERTS FOR INJECTION MOLDINGS

[75] Inventor: Robert A. Sterett, Jackson, Mich.

[73] Assignee: Aeroquip Corporation, Maumee, Ohio

[21] Appl. No.: 607,755

[22] Filed: Feb. 27, 1996

[51] Int. Cl.[6] .................................................. B29C 45/73
[52] U.S. Cl. ........................... 425/144; 249/79; 264/40.6; 264/328.16; 425/450.1; 425/548; 425/552; 425/589
[58] Field of Search .................. 249/79, 80; 264/328.16, 264/40.6; 425/144, 552, 451.2, 548, 450.1, 589

[56] References Cited

U.S. PATENT DOCUMENTS

| | | | |
|---|---|---|---|
| 2,510,907 | 6/1950 | Renaud | 249/79 |
| 2,579,898 | 12/1951 | Brucker | 249/80 |
| 3,733,161 | 5/1973 | Nussbaum | 425/144 |
| 3,964,541 | 6/1976 | Brunner . | |
| 3,978,910 | 9/1976 | Gladwin | 249/79 |
| 4,047,882 | 9/1977 | Morita . | |
| 4,212,623 | 7/1980 | Allen | 249/79 |
| 4,287,941 | 9/1981 | Allen | 249/79 |
| 4,327,045 | 4/1982 | Nishikawa et al. | 249/79 |
| 4,437,641 | 3/1984 | Stavitsky et al. | 249/79 |
| 4,519,763 | 5/1985 | Matsuda et al. | 425/451.2 |
| 4,798,237 | 1/1989 | Nakano . | |
| 4,801,068 | 1/1989 | Graczoll et al. | 249/79 |
| 4,934,918 | 6/1990 | Outland | 249/79 |
| 5,423,670 | 6/1995 | Hamel | 425/552 |

*Primary Examiner*—Jay H. Woo
*Assistant Examiner*—Joseph Leyson
*Attorney, Agent, or Firm*—Emch, Schaffer, Schaub & Porcello, Co., L.P.A.

[57] ABSTRACT

The present relates to an apparatus for molding plastic parts which includes a cavity insert and a core insert wherein each insert has an open area on the shell or back side thereof. A device for circulating fluid through each chamber cools the inserts. In one preferred embodiment, the cavity and core inserts are made using a mold having a ceramic formulation including generally uniform size aggregate materials and carbon fibers. In certain embodiments, the apparatus further includes pressure bearing devices for absorbing molding pressure during operation of the molding apparatus.

17 Claims, 5 Drawing Sheets

MOLD INSERTS FOR INJECTION MOLDINGS

TECHNICAL BACKGROUND

The present invention relates to cast metal injection molding cavities and to a method of tool construction to make the cast metal cavities. The cast metal cavities are suitably durable for production requirements and also satisfy the dimensional and cosmetic standards that the molding industries require for most molded products.

BACKGROUND OF THE INVENTION

Manufacturing industries are intent on increasing their competitiveness by substantially reducing the time and cost of producing injection molding tools. However, it is important that any decreases in time and costs be achieved without sacrificing the quality and durability of the molding tools. With these competing goals in mind, various methods to produce economic and durable rapidly produced tools have been developed. One method relates to the use of reinforced polymer cavity and core inserts. However, when the inserts are exposed to high injection pressures there are often failures of the small surface features of the mold. Further, there is less than desirable heat dissipation through the polymer cavity and core wall sections into the cooling chambers adjacent the cavity and core sections.

Another method uses ion bombardment of a polymer cavity and core surfaces to enhance the surface durability of the cavity and core. This method has limited application, however, since only the areas of the cavity and core which are in a direct line of sight can be bombarded with the ions. In addition, these ion bombarded cavity and core inserts still have less than desirable durability performance.

Still another method uses molded cavity and core inserts which are made from high temperature thermoplastic or thermoset materials. However, these thermoplastic or thermoset inserts often experience unpredictable shrinkage and inadequate heat dissipation during the molding process.

Still another method uses a CNC-type cutting machinery which involves a great time and programming to generate a desired tool path to form the cavity and core inserts. Also, the cost to complete the milling of the inserts often renders such process uneconomical for many commercial uses.

Still another method involves a stereolithography-type approach (SLA) or laminated object manufacturing (LOM) which relies on the building, layer-by-layer, of a material to form the cavity and core inserts. However, the stereolithography produced molds have very limited life expectancy due to material weaknesses, bonding layer failures and the stresses which exist between each layer of material which forms the insert. In addition, there is often poor accuracy in the layering of the material and the resulting mold has an undesirable step or staircase effect on all angles of the mold.

Still another method involves casting of solid cavity and core inserts. However, there are many limitations on the overall sizes of inserts which can be cast. For instance, manufacturing limitations include the amount of molten material that can be transported and poured safely, at a proper rate, and without undesirably lowering the metal temperature. Further limitations on the use of solid cast cavity and core inserts relate to the difficulty in cooling the solid cast inserts. In the past the solid cast inserts had been further subjected to a drilling process to provide a plurality of holes through the insert. A cooling fluid was pumped under pressure through these holes to cool the inserts. However, this isolated cooling system causes stresses in the product being molded due to the uneven cooling of the injection molded product. In addition, there is a tendency of the inserts to warp due to the cyclic fluctuations in the temperatures and the stresses on the inserts.

Accordingly, it is an object of the present invention to provide a casting process to make cavity and core inserts.

It is a further object of the present invention to provide a cast tool which reduces the expenses typically associated with conventional tool building by reducing the time and cost of producing inject molding tools with little sacrifice of the quality and durability of the tool.

It is a further object of the present invention to provide an apparatus useful in a casting process which will aid in producing highly accurate castings.

It is a further object of the present invention to provide cavity and core inserts which are adaptable to be used with standard molding equipment.

The present invention is most suitable for the manufacturing of injection molding cavity and core inserts. According to the present invention, it is now possible to produce cavity and core inserts that can greatly vary in size and complexity. The present invention also provides cast metal molding tools which comprise a core insert and a cavity insert. The cast metal inserts produced according to the process of the present invention are durable and meet most industry production requirements and satisfy most desired dimensional and cosmetic standards.

The present invention also provides an improved ceramic mold for use in forming the core and cavity inserts. The ceramic molds are especially suitable for producing smooth cast inserts of precise dimensions.

These and other objects and advantages of the present invention will be apparent from a reading of the following description of the invention and of the preferred embodiments.

SUMMARY OF THE INVENTION

The above and related objects of the present invention are obtained in a method which comprises, in part, forming ceramic molds which are used to form the cast metal shell cavity and core inserts. Another aspect of the present invention relates to the metal shell core insert and cavity insert which form a part of an injection molding tool.

In certain embodiments, when the desired end molded product has a relatively complicated shape, computer "solid" models of the end molded product are first generated and then from those computer models the cavity and core inserts are generated. The computer generated "solid" models of the cavity and core inserts are then used to form the actual three-dimensional cavity and core inserts.

It is to be understood, that in other embodiments, the ceramic mold can be directly made from a pattern without using computer generated models. However, for the sake of illustration herein, the use of computer generated models will be fully explained. The "solid" models are designed to have the shape of the metal shell cast cavity and core inserts.

In such embodiments, four patterns are required, two for the core insert and two for the cavity insert. The two core inserts comprise: one pattern of the face or front side of the core insert and one pattern of the back or shell side of the core insert. The two cavity inserts comprise: one pattern of the face or front side of the cavity insert, and one pattern of the back or shell side of the cavity insert.

The four computer patterns of the cavity and core inserts are used to produce the patterns for the ceramic molds. In certain preferred embodiments, patterns for the ceramic molds are formed from wood, epoxy or plastic materials by using a stereolithography (SLA), CNC or other cutting equipment to produce the pattern for the ceramic mold.

It is to be understood that, when the various molds and patterns are produced, the patterns and molds are created with the necessary draft angles to allow the removal of the end product article from the mold. Model and pattern expansion is introduced to compensate for any shrinkage in the cast and mold operations which may occur.

After the ceramic mold is formed, it is removed without harm from the pattern. Thereafter, the geometry is reversed to create the cavity and core tools from the ceramic molds.

According to one embodiment of the present invention, the cavity and core inserts are each created to have open or shell areas on the back side of each insert. In one embodiment, the open or shell areas are formed during the casting of the inserts. In another embodiment, the back sides of the inserts are machined out after molding to produce the open areas in the cast cavity and core inserts.

In preferred embodiments, the working model or pattern can be made to represent the part or the reverse of the part (cavity and core pattern) depending on the complexity of the part desired and the tool production method to be used. It is further to be understood that according to the present invention, various methods or a combination of methods can be utilized to produce a working model. It is to be noted that the end product configuration surface and the various tolerance requirements will determine which methods or combination thereof are most appropriate for producing the end product.

It is to be understood that the working pattern used for making the ceramic pour-up mold can be made of various suitable materials which withstand the processing requirements of a ceramic pour-up. It is further to be understood that various ceramic material formulations are useful in providing a suitable ceramic mold. In one embodiment of the present invention (which is especially useful used in a cast iron process), the ceramic material formulation comprises ceramic materials and carbon fibers. The ceramic material formulation provides a ceramic mold having especially good tensile properties and a very desirable surface finish. The ceramic material formulation preferably comprises a relatively narrow range of sizes of ceramic aggregate material along with a predetermined amount of carbon fibers. The presence of the relatively narrow range of size of the aggregate material and the carbon fibers enhances the overall strength of the ceramic mold. The strength of a ceramic mold is needed especially during the demolding of the ceramic mold from the pattern into which the ceramic material has been poured. The ceramic material formulation does not adhere to the surface of the working pattern. The ceramic material formulation is especially useful, in certain embodiments, where the working pattern is formed of a rubber or epoxy type of plastic material. Further, the ceramic material formulation is especially useful in producing a ceramic mold that has detailed, intricate and/or complex surface features. The resulting ceramic pattern has a superior final mold surface appearance.

The strength and density of the ceramic mold is improved over prior art ceramic molds. Carbon fibers are incorporated into the ceramic formulation to provide additional strength. The incorporation of carbon fibers into the ceramic formulation allows for optimum performance during removal of the ceramic from the pattern. The viscosity and fill considerations of the ceramic material have been greatly improved by the use of this ceramic formulation. The lack of presence of large quantities of the large aggregate particles provides a ceramic mold having a more smooth or glossy surface, which surface allows the ceramic model to readily removed from the pattern and provides a smooth surface for the casting of the cavity and core inserts.

In a most preferred embodiment, the carbon fibers are present in an amount in the ceramic formulation at about 0.01 to about 0.02%, by weight, and most preferably about 0.015%, by weight, and the carbon fibers most preferably have an average length of about ¼ to about ¹⁄₁₆ inches and most preferably about ⅛ inches.

The ceramic formulation of the present invention is stronger than conventional ceramic formulations. The increased strength reduces the possibility of damage or breakage which in turn allows the ceramic molds to be made having more complex cavity configurations than was previously possible.

In addition, the carbon fiber content also helps provide the surface of the ceramic mold with a much smoother surface than a conventional ceramic mold. The use of a smooth ceramic mold to cast the metal cavity and core inserts provides metal core and cavity inserts with smooth, less porous surfaces. The smoother, less porous surfaces of the cavity and core inserts allow for easier removal of the plastic molded end products from the inserts.

It has now been found that a suitable ceramic mold can be made without need for curing the ceramic when the ceramic is used in iron castings. In certain embodiments, for example, when the ceramic mold is used to form cast inserts made of iron, the ceramic mold can be subjected to ignition to burn off all but a minute amount of any alcohol or other volatile materials present in the ceramic material which have been entrapped in the "green" ceramic mold. However, in a further embodiment, such as where the ceramic mold is used to cast steel, it is within the contemplated scope of the claimed process herein that the ceramic mold be heated for a predetermined optimum time at a predetermined optimum temperature to completely cure the ceramic mold.

In another embodiment, it is contemplated that ceramic mold can be used to produce the face or front sides of the cavity and core inserts and that a sand-type casting method can be used to form the back or shell sides of the cavity and core inserts. In such embodiments, it has been found that the shelled out back-side of each metal cavity and core insert can be produced using, for example, a zircon-type sand with a binder solution formulation. One advantage of this embodiment is that the sand-type casting formulation provides an acceptably fast temperature dissipation rate during the molten metal pouring procedures to create each insert. Following this procedure, the extreme heat of the molten metal pour has an escape route in a direction through the somewhat porous sand area of the mold. The freshly casted metal insert thus cools and solidifies at the desired rate.

In especially preferred embodiments, it is desirable to produce zircon sand-type mold halves for the back sides of the inserts while the ceramic-carbon fiber composition is used to form the front sides of the inserts. That is, four mold halves are required, two front side ceramic molds and two back side sand-type molds.

To form the metal cavity and core inserts, a suitable molten metal material is poured into the ceramic or ceramic-zircon/sand molds. The molten metal is heated to a desirable temperature (which varies according to each alloy), and the molten metal is fed into an area formed between the mold halves. After cooling, the sand mold and ceramic mold are removed from the metal insert. The time of cooling depends on the size and complexity of the mold being poured.

The final cast metal configuration comprises a cavity insert and a core insert. Each insert has a face or front side which defines the shape of one side of the end product being molded. Each insert also has a back or shell side which defines an open area or chamber. The back side of each insert also defines at least one, and preferably a plurality of support means such as pillars and/or support wall sections. The support pillars and/or wall sections provide strength to the insert. Also, as a cooling fluid flows or is moved through the open chamber, the flow of the fluid is disturbed as it passes around the support pillars and/or wall sections. This flow of fluid around the pillars and/or wall sections provides a quick and uniform cooling to the surface of the insert. It is to be understood that when the metal cavity and core inserts are formed, the metal cavity and core inserts include registration bosses and holes for alignment of the core inserts to the cavity inserts.

In certain embodiments, the core and cavity inserts are formed as a solid cast insert; i.e., there are no cooling chambers formed as a part of the back side of the insert during the casting process itself. In such embodiments, one final processing step includes grinding or milling of the back side of the cavity and core inserts, including providing the support pillars and/or wall sections to form the cooling chamber.

Thereafter, the metal mold is prepared for use by going through several final processing steps. It is to be understood that these final processing steps can be performed in any suitable order. The metal inserts are cleaned using a suitable procedure such as by sand blasting or a glass beading process.

Another processing step involves wherein the edges defining the back sides of the cavity and core inserts are machined or drilled to have various features such as O-ring grooves, a sprue pillar, side clamp slots, ejector pin holes, sprue seat, face side runner system and gates, side water hole connections and the like, which will be further described in detail below in connection with the Figures.

Another processing step can comprise wherein the front sides (or land areas) of the cavity and core inserts are milled or EDM (electron discharge machine) burned to create acceptable mating or parting line areas on the front side of each insert. The front sides of the cavity and core inserts are parallel to each other and are designed to be as close as possible to each other. This parallel relationship of the front sides allows the front sides of each insert to engagingly meet without any uneven areas. That is, a parting line of the mold is created by burning the cavity insert face to the core insert face and registering the flat rear areas of the inserts against the platens of an EDM machine. This creating of the parting provides acceptable "kiss-off" or parting line areas.

Other final processing steps include milling out any areas which may have excess warpage due the casting process and drilling the sides of the inserts to form waterline holes. Thereafter, a plurality of water connection hoses and the like are tapped into the water line holes. A flow of fluid is provided through the back sides of the cavity and core inserts, as will be described in detail below, to cool the inserts.

Another aspect of the present invention includes a molding apparatus for producing an end molded product. The apparatus comprises the metal shell cavity and core inserts and further comprises a mounting plate attached to the cavity insert and a mounting plate attached to the core insert. The cavity mounting plate and core mounting plate each allow the cast cavity insert and core insert, respectively, to be mounted on a base cavity machine platen and a base core machine platen.

The use of the cavity mounting plate and core mounting plate allows the molded product manufacturer to have one molding apparatus that accepts more than one type or size of cavity insert (and cavity mounting plate) and more than one type or size of core insert (and core mounting plate). The present invention provides an apparatus with increased versatility by using different cavity and core inserts. That is, the cavity machine platen and core machine platen are configured to accept different cavity mounting plates and core mounting plates: respectively, as will be further described in detail below.

According to one embodiment of the present invention, the rear side of the cavity insert is ground or milled flat and parallel to the face surface of the cavity insert. An "O" ring groove is then milled into the rear side around that area intended to accept a sprue bushing. An additional groove is milled around the entire periphery of the rear side of the cavity insert. The grooved areas are then filled with a suitable leak deterrent material such as a silicone material. The cavity insert is then mounted and clamped to an "A" mold plate which having a sprue opening cut into it. The front side of the mold plate has been ground flat and parallel to the back side of the mold plate A. This results in a leak proof, hollow, sub assembly referred to as a "shell" or a "water jacket."

The rear side of the core insert is ground or milled flat and parallel to the face surface of the core insert. A groove is milled around the entire periphery of the rear side of the core insert. Additional grooves are milled into the rear side of the core insert around the areas that accept ejector pins. The ejector pins aid in removing the end molded product from the molding apparatus, as will be described in detail below. The grooved areas are then filled with a suitable leak deterrent material. The core insert is mounted to a "B" mold plate to form a "B" sub assembly. The "B" sub assembly is then drilled, through core insert and "B" mold plate, in the ejector pin location areas, preferably from the face side, for accurate ejector pin placement.

A further processing step comprises mounting both the "A" sub assembly and the "B" sub assembly into an electronic discharge machine (EDM), utilizing the flat and parallel rear sides of each "shell assembly," and burning the two faces together to form a parting line, or "kiss off" area on each casting for flash free plastic part manufacturing.

The "A" sub assembly is then mounted to a stationary platen of a molding press which matingly engages a sprue bushing. The "B" sub assembly is assembled to a suitable ejector box sub assembly, which has a predetermined number of the desired length and diameter ejector pins. The "B" sub assembly is held in place and in alignment with the ejector box. The entire "B" sub assembly with the ejector box sub assembly is then clamped to a movable platen of the molding press.

When a different end product is to be formed, a corresponding different cavity insert and mounting plate are operatively connected to the cavity machine platen and a different core insert and mounting plate are operatively connected to the core machine platen.

Another aspect of the present invention is that, in certain embodiments, the apparatus further comprises at least one, and preferably a plurality of outside pressure bearing means which are present adjacent the core and cavity mounting plates, as will be discussed in detail below. During operation of the molding apparatus, the outside pressure bearing means act to absorb or bear the brunt of the pressure exerted against the core insert and the cavity insert. The presence of the pressure bearing means extends the useful life of the cavity and core inserts.

Once the insert/plate subassemblies are attached to the machine platens and/or ejector plates, a sprue bushing and a machine nozzle are operatively connected to the cavity machine platen. During operation of the molding apparatus, a suitable molding or plastic material is injected through the sprue bushing and into a molding or cavity area defined by the front sides of the cavity insert and the core insert.

In various embodiments, it is desirable to coat using, for example, a nickel-plating material or other type of suitable material to cover the entire surface of both the cavity and core inserts, front and back. In other embodiments, it is desirable to pressure seal each insert with a "radiator leak sealing" type of solution to eliminate any access to any porous areas in the cast inserts. In addition, if the nickel-plating is used, the nickel-plating adds a lubricating quality to the molding area defined by the front sides of the cavity and core inserts to allow for easier plastic part removal during the molding process.

The water lines are operatively connected to the cavity insert and the core insert. A water circulation system is connected to the cavity and core inserts to cool the inserts. preferred embodiment, the cooling water used in the water circulation system flows in parallel, as opposed to in series, in order to minimize mold face temperature fluctuations.

In preferred embodiments, use of a vacuum water circulation system prevents water leakage into the cavity area. A vacuum device is attached to the cavity and core insert connectors. The water circulation system pulls or draws water through the inserts as opposed to pushing or pressurizing the water into the inserts in order to avoid water leaks into the molding area.

By flood cooling the entire back sides or chambers of the inserts during the operation of the molding apparatus, an efficient cooling of the inserts is achieved. Further, the presence of support means allows the water flow to be agitated through the chambers on the back sides of the inserts to maximize the cooling capability and to avoid hot spots from forming in the inserts.

The present invention can be employed for casting any suitable type of metal such as, iron, steel, aluminum and the like.

The present invention provides a molding apparatus at a greatly reduced cost and at a greatly reduced time of preparation when compared with prior art systems. In particular, complex configurations can be effectively molded using the process of the present invention.

DESCRIPTION OF THE PREFERRED EMBODIMENTS

Figure 1:
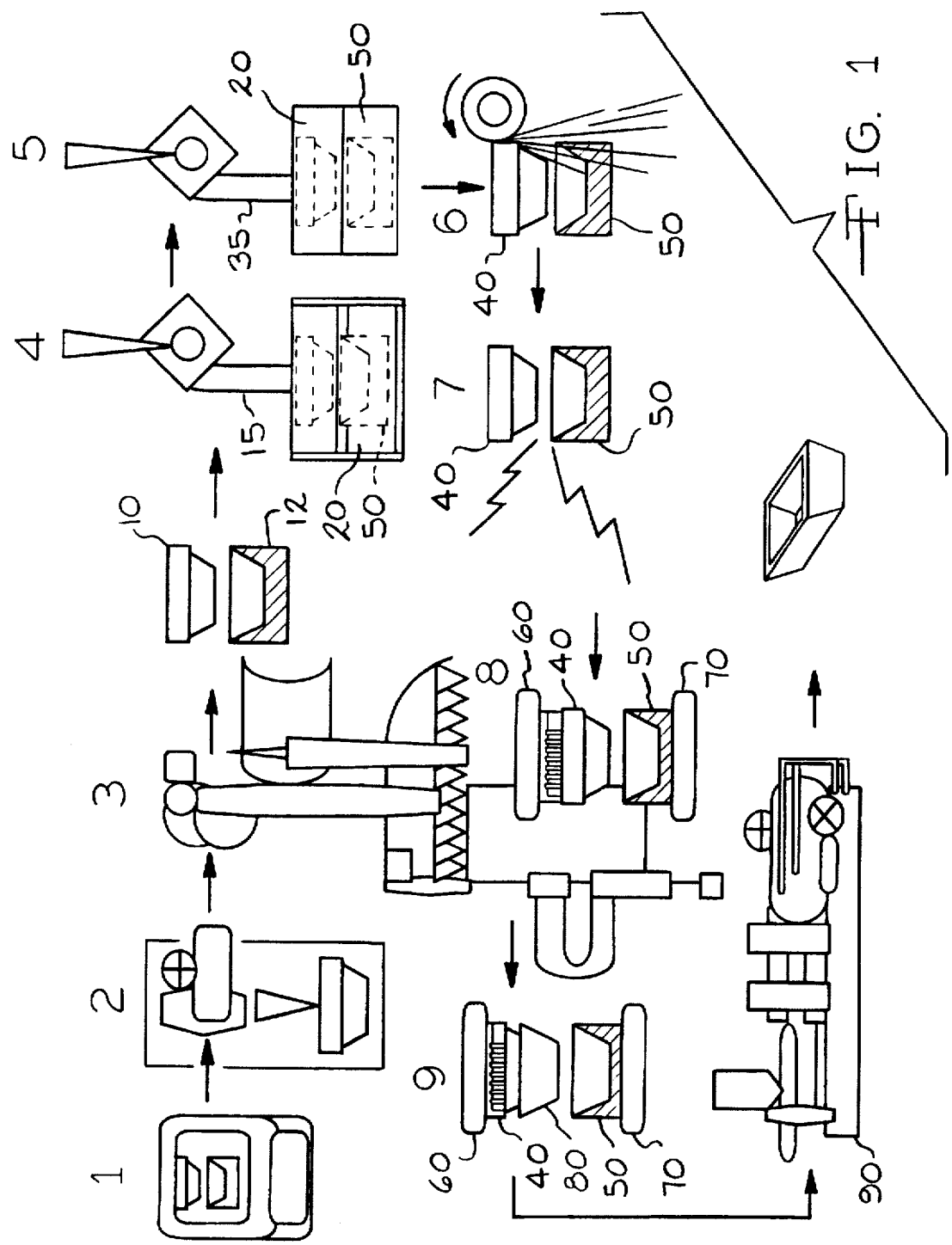
FIG. 1 is a flow chart for a method of the present invention.
Figure 2:
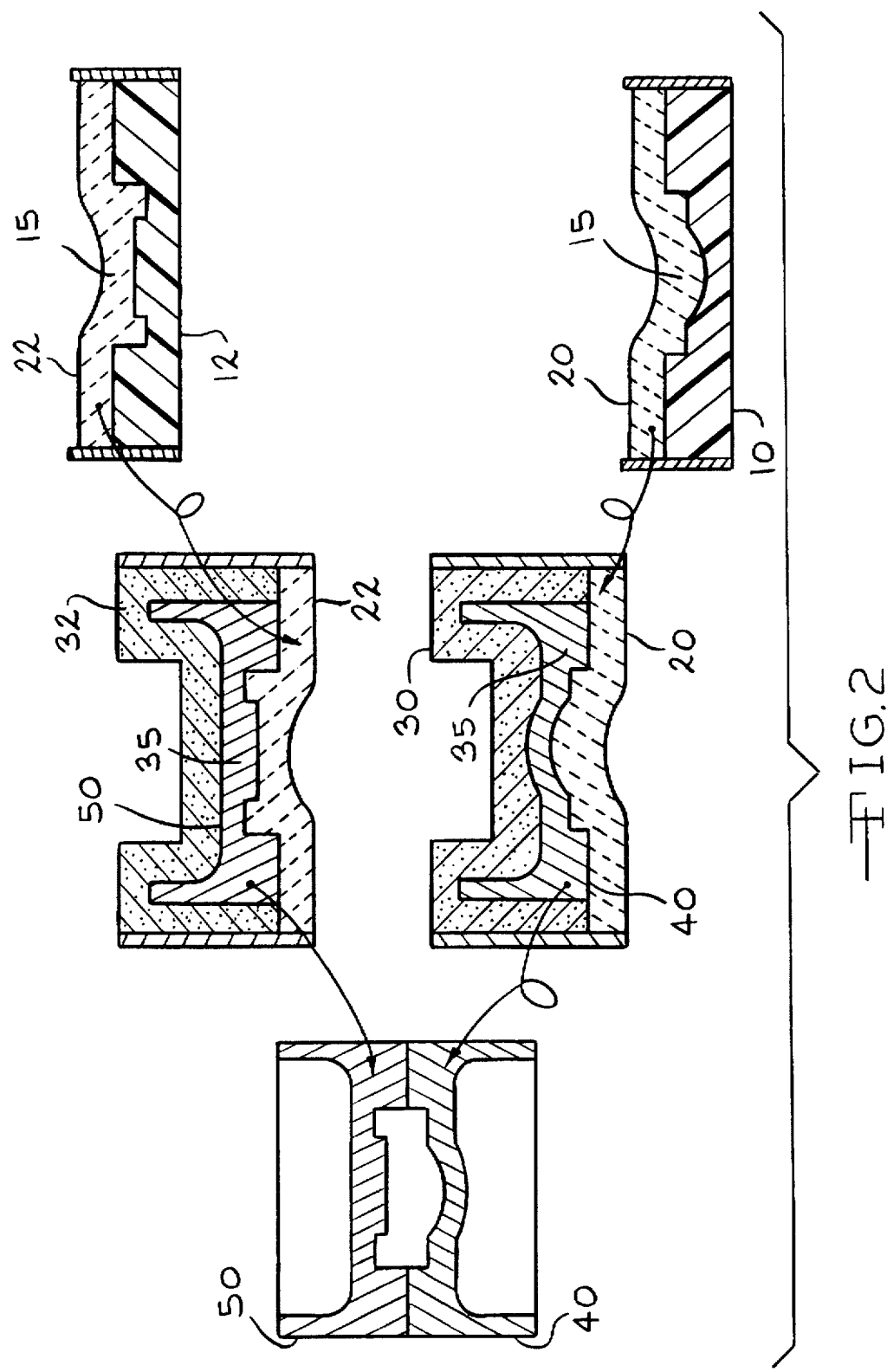
FIG. 2 is a schematic diagram showing a process for making a core insert and a cavity insert using ceramic molds and sand-type molds.

Referring now to FIGS. 1 and 2, one embodiment of a method for forming cast metal core and cavity inserts is shown. It is to be understood that in various embodiments not all steps of this method are required and the various steps used are dependent upon the complexity of the mold being produced.

The method commences with the step 1 of preparing a model of the type of mold to be ultimately produced. This can be done using a CAD operation or other means as described above.

Step 2 involves converting the computer generated data into a three-dimensional object for example, using stereolithography modeling to produce a mold pattern. In step 2, a first model of the product to be formed is made.

Step 3 shows the model preparation wherein the model itself is made into a pattern. In step 3 a core insert pattern 10 and a cavity insert pattern 12 are made of a suitable material. The choice of material in the pattern allows a complex structure of the ultimate product to be formed. Also the choice of material must be able to withstand the temperatures of the ceramic formulation.

Step 4 involves the pouring of a ceramic formulation into and around the pattern. As described above, the ceramic formulation contains, in a preferred embodiment, generally uniform size ceramic aggregate materials and carbon fibers to allow the ceramic mold to have the desired smooth surface and strength, the result being a ceramic mold 20.

It is to be understood that, in certain embodiments, the various operational steps described herein are optional and that the method used to make the patterns for use in making the ceramic mold depend on the complexity of the part to ultimately be molded. Thus, in various embodiments it is not necessary to use the early steps of computer and/or stereolithography modeling. Rather, it is also within the contemplated scope of the present invention that a model of the article can be made itself. For molding a relatively uncomplex shape a suitable pattern can be made and the ceramic material can be poured into the pattern into without any earlier models being used. However, for the sake of illustration, the various steps which can be practiced in accordance with the present invention are described in detail herein.

Thereafter, in step 5 the ceramic molds 20 are used to receive a suitable molten metal 35 which then forms a metal core insert 40 and a metal cavity insert 50.

Referring now in particular to FIG. 2, a schematic illustration of one embodiment of the present invention is provided which shows the use of ceramic molds and sand molds, as described above. It should be understood however, that the embodiment shown in FIG. 2 can be also practiced using ceramic molds for both halves of the insert molds rather than the ceramic and sand molds as shown in FIG. 2. In FIG. 2, the working pattern 10 of the front side of the core insert 40 and the working pattern 12 of the front side of the cavity insert 50 are formed of a suitable material. The ceramic formulation 15 is poured into the working pattern 10 to form a ceramic mold 20 for the core insert 40. The ceramic formulation 15 is also poured into the working pattern 12 to form a ceramic mold 22 for the cavity insert 50.

A sand-type mold 30 of the back side of the core insert 40 is formed and a sand-type mold 32 of the back side of the cavity insert 50 is formed, as described above.

The ceramic mold 20 of the front side of the core insert 40 and the sand type mold 30 of the backside of the core insert 40 are brought into mating engagement and a suitable molten metal material 35 is injected into the space between the ceramic mold 20 and the sand-type mold 30 to form the core insert 40. Likewise, the ceramic mold 22 of the front side of the cavity insert 50 and the sand-type mold 32 of the back side of the cavity insert 50 are brought into mating engagement and a suitable molten metal material 35 is injected into the space between the ceramic mold 22 and the sand-type mold 32 to form the cavity insert 50.

Referring again to FIG. 1, in step 6, the core insert 40 and the metal cavity insert 50 are further prepared for use such as by grinding and other preparations.

In step 7, the face surfaces of 40 and 50 are produced together to form an extremely close parting line or "kiss-off" area between the core insert 40 and the cavity insert 50.

In step 8, the core insert 40 is operatively connected to a "B" side sub assembly 60 and the cavity insert 50 is mounted to an "A" side sub assembly 70. The core "B" sub assembly 60 and the cavity "A" sub assembly 70 are then used to produce an end molded product 80 in a molding apparatus 90, generally shown as Step 9.

Figure 3:
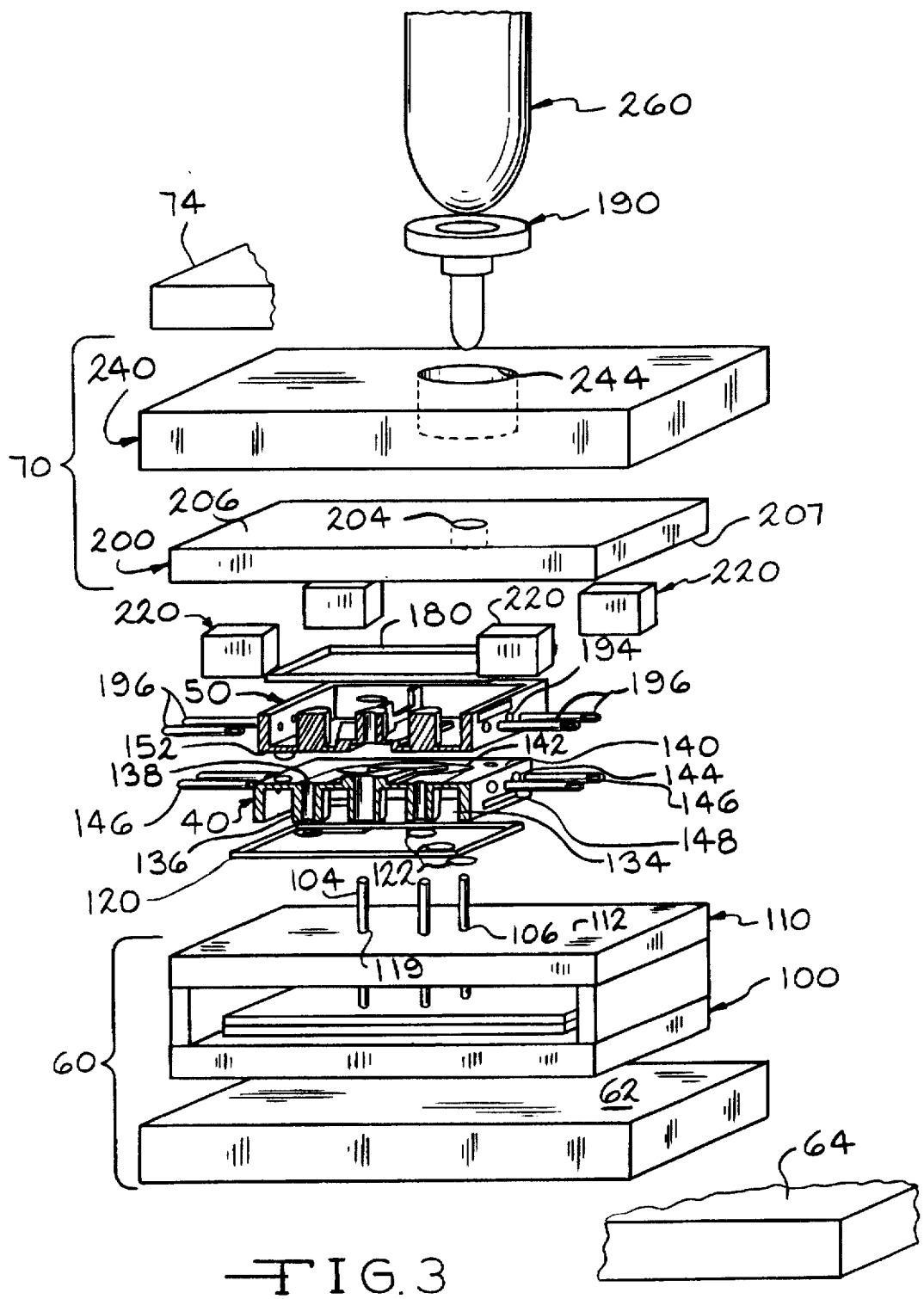
FIG. 3 is an exploded perspective view, partially in cross-section, of one embodiment of the present invention showing a portion of a molding apparatus comprising a cast metal shell core and cavity and mounting plates therefor.
Figure 4:
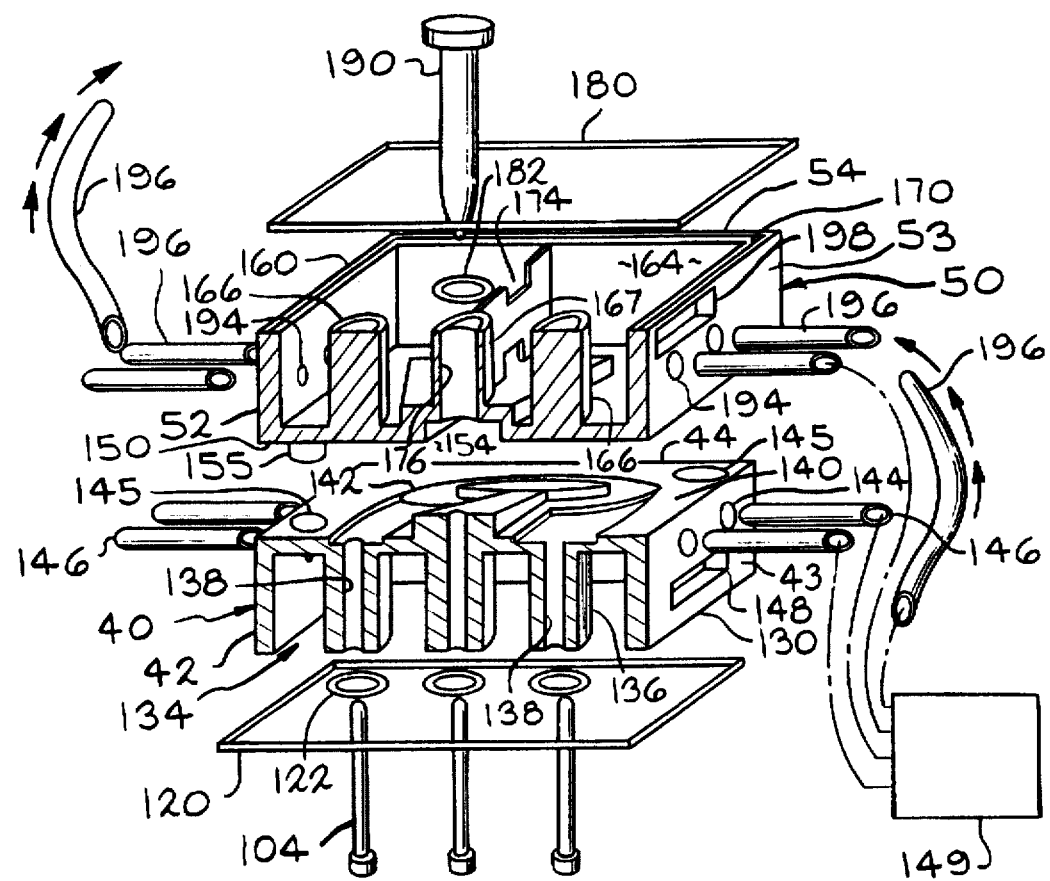
FIG. 4 is a detailed view of a cavity insert and a core insert according to one embodiment of the present invention.

Referring now to FIGS. 3 and 4, exploded perspective views of a portion of the molding apparatus 90 of the present invention are generally shown.

In FIG. 3, the core sub assembly 60 generally comprises a mold base 62 operatively connected to an ejector box 100, which in turn is operatively connected to a core "B" mounting plate 110. The sub assembly 60 is operatively connected to a movable machine platen 64.

The ejector box 100 has at least one, and in most embodiments, a plurality of ejector pins 104 which extend through the "B" mounting plate 110.

It is to be understood that various sizes of core mounting plates can be utilized and that the core inserts are interchangeable on the various size mounting plates. It is further to be understood that, for each different molding operation, various holes 106 are drilled through the core mounting plate 110 and matched with holes in the ejection box 100 such that the ejector pins 104 extend beyond an upper surface 112 of the core mounting plate 110. O-ring grooves 119 are cut in the core mounting plate 110 adjacent the openings 106 which receive the ejector pins 104. O-rings 122 are matingly received in the O-ring grooves 119 surrounding the openings 106 to prevent any leakage of fluid, as will be described in detail below.

Referring now to FIGS. 3 and 4, the core insert 40 is adjacent and operatively and sealingly connected to the upper surface 112 of the core plate 110. The core insert 40 has a back or shell side 130 and a front side 140. For ease of illustration the core insert 40 is shown in cross-section so that other features of the core insert 40 can be shown. However, it is to be understood that an O-ring 120 secures the back side 130 of the core insert 40 to the core mounting plate 110. The back side 130 of the core insert 40 defines end walls 42 and 43 and side walls 44. The walls 42, 43 and 44 define at least one interconnected opening or chamber 134 for receiving a cooling fluid. The back side 130 further defines at least one, and preferably a plurality, of support means 136 such as pillars which axially extend in a direction away from the front side 140. The positions of the support pillars 136 are determined by the ultimate desired configuration of the final end product to be molded. Other considerations for the position of the support pillars 136 include providing agitation of the cooling fluid flow through the chamber 134 so that the core insert 40 is rapidly and evenly cooled. In the embodiment shown, each core pillar 136 defines an axially extending opening 138 for receiving the adjacent ejector pin 104. However, it should be understood that in other embodiments that various of the support pillars 136 can have a solid configuration and are present for strengthening the core insert 40 and for providing agitation to the flow of cooling fluid through the chamber 134.

In the embodiment shown, the front side 140 has a three-dimensional surface 142. The surface 142 defines a portion of a cavity area 154 for receiving a plastic molding material (not shown). The surface 142 defines the shape of a side of the ultimate product to the molded.

The core insert 40 has openings 144 which extends through each of the opposing side walls 42 and 43 of the core insert 40. (In the embodiment shown, the core insert 40 has a plurality of openings 144. However, it is to be understood that in other embodiments the core insert 40 can have one opening 144). The openings 144 are in communication with the chamber 134. Although not shown, water or fluid connection valves and other coupling means are operatively connected to the openings 144. Suitable fluid lines 146 are generally connected to the openings 144 and to a water or fluid circulator system 149. In the embodiment shown, each side wall 42 and 43 has at least one slot 148 for clamping the core insert 40 to the mold apparatus 90. In the embodiment shown, the slot 148 extends along an exterior surface of the walls 42 and/or 43.

The cavity insert 50 is adjacent the front side 140 of the core insert 40. The cavity insert 50 has a front side 150 which, in the embodiment shown, has a three-dimensional surface 152. The surface 152 defines an opposing portion of the cavity area 154 which receives the plastic molding material.

The cavity insert 50 is operatively connected to the sub assembly 70 which comprises an "A" mounting plate 200 which is operatively connected to a mold base 240. The sub assembly 70 is operatively connected to a machine platen 74.

In operation, the front side 150 of the cavity insert 50 and the front side 140 of the core insert 40 matingly engage such that when the plastic material is being injected into the cavity area 154 there is no escaping of material from the cavity area 154. The core insert 40 contains at least two registration areas 145 which each receive a registration pin 155 extending from the front side 150 of the cavity insert 50. The registration areas 145 aid in aligning the cavity insert 50 to the core insert 40 during the cycling operation of the molding apparatus 90.

The cavity insert 50 has a back or shell side 160 which generally defines end walls 52 and 53 and side walls 54. The walls 52, 53 and 54 define at least one interconnected opening or chamber 164 for a receiving cooling fluid. The back side 160 further defines at least one, and preferably, a plurality of support means 166 such as pillars. The back side 160 of the cavity insert 50 defines an O-ring receiving groove 170 for receiving an O-ring 180. The cavity insert 50 has at least one support means 167 which defines an axially extending opening 176 in communication with the cavity area 154. The opening 176 receives the plastic material which is injected into the cavity area 154. The opening 176 matingly engages a sprue bushing 190 for delivering the plastic material. It should be understood that for optimum operation in various embodiments it is desired to have an O-ring 182 adjacent the support means 167.

In addition, in certain embodiments each cavity and/or core insert can have one or more additional support means such as walls or ribs 174 to provide additional support to the inserts 40 and/or 50. For sake of clarity in the drawings, ribs are only shown in the cavity insert 50; however, it should be understood that various support ribs can be present, if necessary or desired, in the cavity insert 50 and/or the core insert 40.

The cavity insert 50 has openings 194 which extend through each of the side walls 52 and 53 of the cavity insert 50. (In the embodiment shown, the cavity insert 50 has a plurality of openings 194. However, it is to be understood that in other embodiments, the cavity insert 50 can have one opening 194). The openings 194 are in communication with the chamber 164. Although not shown, water or fluid connection valves and other coupling means are operatively connected to the openings 194. Suitable fluid lines 196 are operatively connected to the openings 194 and to the fluid circulator system 149. In the embodiment shown, each side wall 52 and 53 has at least one slot 198 for clamping the cavity insert 50 to the mold apparatus 90. In the embodiment show, the slot 198 extends along an exterior surface of the walls 52 and 53.

The back side 160 of the cavity insert 50 is matingly engaged to the cavity mounting plate 200. The cavity mounting plate 200 defines at least one opening 204 for receiving the sprue bushing 190. It is to be understood that various sizes of cavity mounting plates can be utilized. It is to be further understood that, for each different molding operation, the different cavity mounting plate can have the optimum placement of the opening 204 for receiving the sprue bushing 190.

The cavity mounting plate 200 has an upper surface 206 which is adjacent the cavity mold base 240. The cavity mold base 240 has an opening 244 which receives the sprue bushing 190. The sprue bushing 190 is operatively connected to a machine nozzle 260 for injecting the suitable molten plastic material into the cavity area 154. The cavity mold base 240 is operatively connected to the cavity machine platen 74.

It is to be understood that the apparatus 90 can have a removable core mounting plate 110 and a removable cavity mounting plate 200. Thus, according to the present invention, it is possible for the mold user to have available a fewer number of mounting plates which are useful with more than one cavity insert and more than one core insert. It is also now possible to have available relatively standard size cavity mounting plates and core mounting plates.

In certain embodiments of the present invention, the apparatus 90 further contains a plurality of pressure bearing means 220. In a preferred embodiment, there are at least four pressure bearing means 220, one positioned adjacent each corner of the core and cavity inserts 40 and 50. The pressure bearing means 220 preferably have a height that is slightly longer or taller than the combined depth of the core insert 40 and the cavity insert 50 such that most of the molding pressure is absorbed by the pressure bearing means 220. The pressure bearing means 220 allow the cavity mounting plate 200 and the core mounting plate 110 to be moved into mating engagement without putting excess pressure on the core insert 40 or the cavity insert 50. Thus, in certain embodiments, with the presence of the pressure bearing means 220, the core insert 40 and the cavity insert 50 are brought into facing engagement without undue stress or pressure put on the inserts 40 and 50. In certain embodiments of the present invention, the presence of the pressure bearing means 220 extends the useful life of the inserts 40 and 50.

It is to be understood that, in preferred embodiments, during the operation of the apparatus 90 the fluid circulator system 149 moves or pulls the fluid through the openings 194 and into the chamber 164 in the cavity insert 50 and through the openings 144 and into the chamber 134 in the core insert 40. The rapid pulling movement of the fluid in a negative or vacuum manner allows rapid cooling of the inserts without the concern of having water fluid leaks into the cavity area 154 through various potential openings in the inserts. Further, the fluid is agitated by being pulled around the support pillars 136 and 166 and through the openings 134 and 164 to allow agitation and rapid cooling of the inserts 40 and 50.

The core and cavity inserts of the present invention provide cavity area pressure resistance such that rapid cooling occurs with minimal risk of leakage. In addition, the present invention allows leak-free injector pin placement in the desired areas so that the end product is readily removed from the cavity area 154. Further, there is a leak-free sprue bushing placement which is especially desirable so that no water or cooling fluid is allowed to migrate into undesirable areas. It is further understood that, in various embodiments, cooling fluid leakage occurring from chambers 134 and 164 into cavity area 154 is prevented by the chambers 134 and 164 being at a lower pressure than the cavity area 154. Therefore, any leakage which occurs from less than accurate machining of inserts 40 and 50 results in air moving into the chambers 134 and 164 rather than fluid leaking into the cavity area 154.

With the above-described mold casting apparatus and process, it is now possible to more efficiently mold injection molded parts. The temperature of the mold is efficiently regulated such that the mold can quickly produce the desired end product. The product being molded is subjected to more consistent cooling and is, therefore, less affected by stresses.

In operation, the sub assembly 60 comprising the ejector box 100, the core mounting plate 110 and the core insert 40, are moved along an axis toward and away from facing engagement with the cavity insert 50. Plastic material is injected through the sprue bushing 190 into the cavity area 154 when the core insert 40 is in mating engagement with the cavity insert 50. Simultaneously, fluid is pulled through the openings 144 and 194 into the chambers 134 and 164, respectively, to cool the plastic material to below its temperature of crystalinity (Tc) such that the molded end product is produced. The pressure bearing means 220 allow the majority of the required clamp pressure to be transferred to the core mounting plate 110 and cavity mounting plate 200. According to the present invention, it is possible to produce casting inserts 40 and 50 having thinner wall sections than previously used in other molding processes. The thinner walls of the inserts further allow for a rapid dissipation of heat and to satisfy processing parameters for the casting vendor.

The mounting plates 110 and 200 hold the cavity insert 50 and core insert 40, respectively, in mating engagement without subjecting the inserts 40 and 50 to undesirable stress or crack producing pressures. Upon completion of the molding process the subassembly 60 is moved in a direction away from the subassembly 70 and the ejector pins 104 push against the molded product to force the molded product from the mold.

Figure 5:
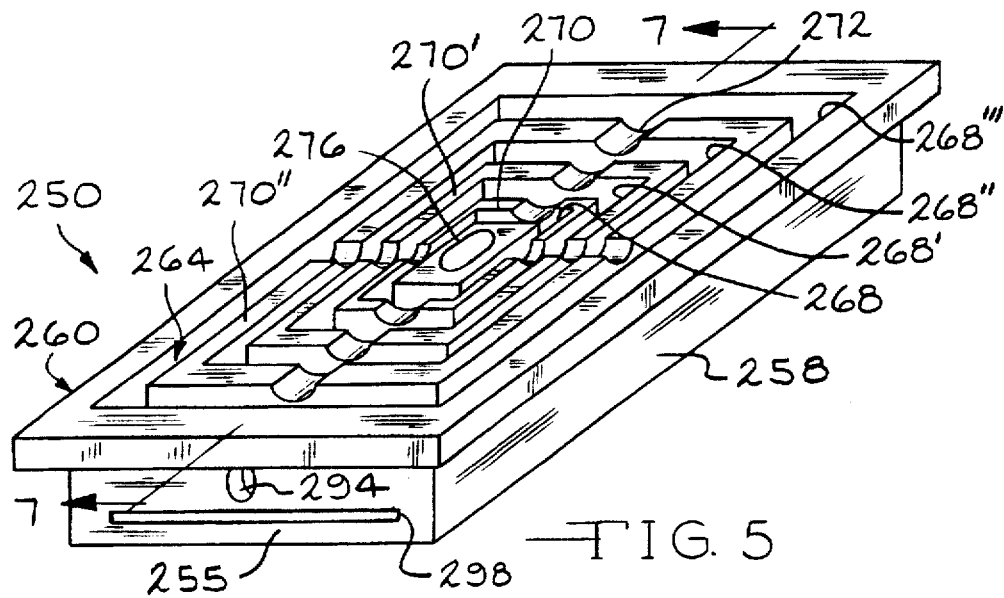
FIG. 5 is a perspective view of another embodiment of a cavity insert.
Figure 6:
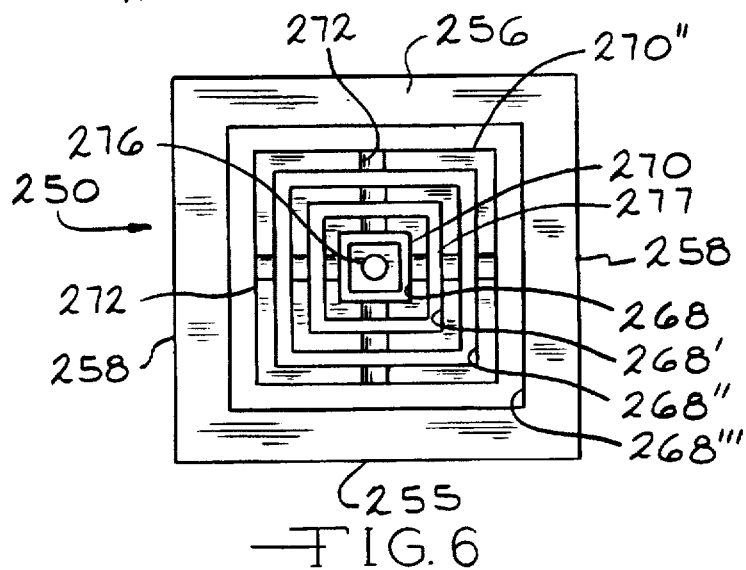
FIG. 6 is a top or plan view of the embodiment shown in FIG. 5.
Figure 7:
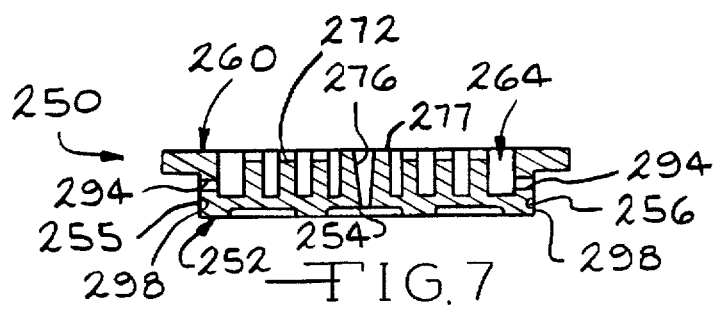
FIG. 7 is a cross-sectional view taken along the line 7—7 in FIG. 5.

Referring now to FIGS. 5–7 an alternative embodiment of a cavity insert 250 is shown. It is to be understood that a core insert (not shown) can have the same rear face configuration as will be described for the cavity insert 250. The cavity insert 250 can be operatively connected to the subassembly 70 in a manner as described above. As seen in FIG. 7, the cavity insert 250 has a front side 252 which defines a three-dimensional surface 254. The surface 254 defines a portion of a cavity area similar to the cavity area 154 (shown in FIGS. 3 and 4) for receiving a plastic molding material.

The cavity insert 250 has a back or shell side 260 which generally defines end walls 255 and 256 and side walls 258. The walls 255, 256 and 258 define at least one interconnected opening or chamber 264 for receiving a cooling fluid. In the embodiment shown, the chamber 264 defines a plurality of interconnected openings or channels 268 which are defined by support means 270.

The cavity insert 250 has at least one center area or support pillar 277 which defines an axially extending opening 276 which is in communication with the cavity area 254. The opening 276 receives the plastic material which is injected into the cavity area 254. The opening 276 matingly engages a sprue bushing (not shown) for delivering the plastic material.

The back side 260 defines at least one support means 270 and preferably, a plurality of support means such as wall sections 270. In the embodiment shown, the support means 270 comprises a plurality of wall sections (270, 270', 270") which axially extend from the front side 252 of the insert 250. It is to be understood that the support means 270 can comprise a fewer or a greater number of wall sections than as shown in FIGS. 5–7. However, for ease of illustration, the support means 270 shown herein has wall sections designated as 270, 270' and 270".

In the embodiment shown, the support wall sections 270 are symmetrically positioned in the chamber 264. In certain embodiments, the thickness of each of the wall sections 270 is generally uniform for ease of manufacturing the insert. However, it is to be understood that the wall sections 270 can vary in thickness.

In certain embodiments it is desired that the distance between the wall sections 270 vary. As seen in FIGS. 5–7, the distance between the first wall section 270 and the center area 277 is less than distance between the first wall section 270 and the second wall section 270'. Correspondingly, the third wall section 270''' is spaced apart from the second wall section 270' at a distance greater than the distance between the second wall section 270' and the first wall section 270. That is, each of the channels 268''', 268'', 268' and 268 in the chamber 264 have a correspondingly wider width the farther removed each channel is from the center area 277 of the insert 250.

The relatively closer distance between the wall sections 270 nearer the center area 277 provides support to the insert 250. As the plastic material being inserted into the cavity area 254 there is more support where the plastic material is under the most pressure. The decreasing gap or width between the wall sections 270 allows the insert 250 to withstand higher injection pressures of plastic material being inserted into the cavity area 254.

The support wall sections 270 define at least one water flow channel or opening 272 which allows fluid to flow from the one channel 268 on one side of a wall section 270 to another channel 268' on the other side of the wall section 270.

The cavity insert 250 has at least one opening 294 which extends through each of the side walls 255 and 256 of the cavity insert 250. (In the embodiment shown, the cavity insert 250 has one opening 294. However, it is to be understood that in other embodiments the cavity insert 250 can have a plurality of openings). The opening 294 is communication with the chamber 264. Although not shown, water or fluid connection valves and other coupling means operatively connect the opening 294 to suitable fluid lines, such as those shown as 196 in FIGS. 3 and 4, and to a fluid circulator system, similar to that shown as 149 in FIGS. 3 and 4.

In the embodiment shown, each side wall 255 and 256 has at least one slot 298 for clamping the cavity insert to 50 to the mold apparatus. In the embodiment shown, the slot 298 extends along an exterior surface of the walls 255 and 256.

Although not shown, it is to be understood that a core insert can have the same or similar rear side configuration as shown in FIGS. 5–7. It is further to be understood that the embodiment for the cavity insert shown in FIGS. 5–7 is especially useful in high pressure molding operations where the cavity insert and/or core insert are subjected to extreme high pressures.

While the invention has been described in terms of various preferred embodiments, the skilled artisan will appreciate the various modifications and substitutions, omissions and changes which may be made without departing from the spirit thereof. Accordingly, it is intended that the scope of the present invention be defined solely by the scope of the following claims including the equivalents thereof.

I claim:
1. A molding apparatus (90) comprising
 a core insert (40) removably attached to a first, core mounting plate (110), the core insert (40) having a back side (130) and a front side (140), the back side (130) defining a chamber (134) for receiving a cooling fluid, the back side (130) having at least one support means (136) axially extending in a direction away from the front side (140), and
 a cavity insert (50, 250) removably attached to a second, cavity mounting plate (200), the cavity insert (50, 250) having a back side (170, 260) and a front side (160, 252), the back side (170, 260) of the cavity insert (50, 250) defining a chamber (164, 264) for receiving a cooling fluid, the back side (170, 260) of the cavity insert having at least one support means (166, 270) axially extending in a direction away from the front side (160, 252) of the cavity insert (50, 250), the front side (140) of the core insert (40) and the front side (160, 252) of the cavity insert (50, 250) defining a cavity (154) for molding an article;
 at least one means (149) for circulating a fluid through the chambers (134 and 154) of the core insert (40) and cavity insert (50, 250); and,
 at least one pressure bearing means (220) adjacent the core (40) and cavity (50, 250) inserts, the pressure bearing means (220) having height that is longer than the combined height of the core insert (40) and the cavity insert (50), the pressure bearing means (220) substantially absorbing the molding pressure when the core insert (40) and cavity insert (50, 250) are brought into facing engagement under molding pressure during operation of the molding apparatus (90), the pressure bearing means substantially transfers the molding pressure from the core insert (40) and the cavity insert (50, 250) to the core mounting plate (110) and the cavity mounting plate (200), respectively, during operation of the molding apparatus (90).

2. The apparatus (90) of claim 1, wherein at least one of the cavity insert (50) and the core insert (40) includes walls defining said respective chamber (134 or 164, 264) and contains one or more support ribs (174) extending from said respective walls (42, 43, 44; 52, 53, 54).

3. The apparatus (90) of claim 1, wherein the means (149) for circulating fluid is operatively connected to the core insert (40) and the cavity insert (50) to pull fluid through the chambers (136 and 166).

4. The apparatus (90) of claim 1, wherein the cavity insert (50) and core insert (40) have substantially smooth or glossy surfaces, the cavity insert and the core insert each being formed using a ceramic mold (12, 10) having a formulation comprising ceramic particles and carbon fibers.

5. The apparatus (90) of claim 4, wherein the carbon fibers are present in the ceramic formulation at about 0.01 to about 0.02%, by weight, and have an average length of about ¼ to about 1/16 inches.

6. The apparatus (90) of claim 5, wherein the carbon fibers are present in about 0.015%, by weight, and the carbon fibers have an average length of about ⅛ inches.

7. The apparatus of claim 1, wherein the support means (136) of the core insert (40) comprises a plurality of pillars (136) which axially extend from the back side (130) of the core insert (40).

8. The apparatus of claim 1, wherein the support means (166) of the cavity insert (50) comprise a plurality of pillars (166) which axially extend from the back side (170) of the cavity insert (50).

9. The apparatus of claim 1, wherein the support means (270) of the cavity insert (250) comprises a plurality of wall sections (270) which axially extend from the back side (260) of the cavity insert (250).

10. The apparatus of claim 9, wherein the support means (270) of the cavity insert (250) comprises a first wall section (270) which is spaced apart at a first predetermined distance from an adjacent, second wall section (270').

11. The apparatus of claim 10, wherein the second wall section (270') is spaced apart at a second predetermined distance from an adjacent third wall section (270") wherein the second predetermined distance is greater than the first predetermined distance.

12. The apparatus of claim 1, wherein the support means of the core insert comprises a plurality of wall sections which axially extend from the back side of the core insert.

13. The apparatus of claim 12, wherein support means of the core insert comprises a first wall section which is spaced apart at a first predetermined distance from an adjacent, second wall section.

14. The apparatus of claim 13, wherein the second wall section is spaced apart at a second predetermined distance from an adjacent third wall section wherein the second predetermined distance is greater than the first predetermined distance.

15. The apparatus of claim 9, wherein at least one said wall section (270) defines a channel (272) for allowing fluid to flow into the chamber (264) of the cavity insert (250).

16. The apparatus of claim 12, wherein at least one said wall section defines a channel for allowing fluid to flow into the chamber (134) of the core insert (40).

17. The apparatus of claim 1 wherein the apparatus (90) includes at least four of said pressure bearing means (220), one of said pressure bearing means (220) being positioned adjacent each corner of the core insert (40) and the cavity (50, 250) insert.

* * * * *

UNITED STATES PATENT AND TRADEMARK OFFICE
CERTIFICATE OF CORRECTION

PATENT NO. : 5,744,173
DATED : April 28, 1998
INVENTOR(S) : Robert A. Sterett

It is certified that error appears in the above-indentified patent and that said Letters Patent is hereby corrected as shown below:

In Claim 1, column 14, at line 61, between the words "having" and "height", please insert --a--.

Signed and Sealed this

Eleventh Day of August 1998

Attest:

Attesting Officer

BRUCE LEHMAN

Commissioner of Patents and Trademarks